United States Patent
Yang

(10) Patent No.: US 11,304,105 B2
(45) Date of Patent: Apr. 12, 2022

(54) SYSTEM INFORMATION SENDING METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/619,241

(22) PCT Filed: Jul. 28, 2017

(86) PCT No.: PCT/CN2017/094884
§ 371 (c)(1),
(2) Date: Dec. 4, 2019

(87) PCT Pub. No.: WO2019/019140
PCT Pub. Date: Jan. 31, 2019

(65) Prior Publication Data
US 2020/0169929 A1 May 28, 2020

(51) Int. Cl.
*H04W 36/00* (2009.01)
*H04W 36/06* (2009.01)
(Continued)

(52) U.S. Cl.
CPC ........... *H04W 36/06* (2013.01); *H04L 5/1469* (2013.01); *H04W 36/04* (2013.01);
(Continued)

(58) Field of Classification Search
CPC ..... H04W 36/06; H04W 36/04; H04W 76/11; H04W 72/005; H04W 84/042; H04L 5/1469
See application file for complete search history.

(56) References Cited

U.S. PATENT DOCUMENTS

2009/0298497 A1* 12/2009 Lee .................. H04W 48/08
455/434
2011/0117951 A1* 5/2011 Lee .................. H04W 72/02
455/513

(Continued)

FOREIGN PATENT DOCUMENTS

| CN | 101902800 | 12/2010 |
|---|---|---|
| CN | 103220655 | 7/2013 |

(Continued)

OTHER PUBLICATIONS

WIPO, ISR for PCT/CN2017/094884, Apr. 13, 2018.
(Continued)

*Primary Examiner* — Khai M Nguyen
(74) *Attorney, Agent, or Firm* — Hodgson Russ LLP

(57) ABSTRACT

The present disclosure provides a method for transmitting system information, a network device, and a terminal device. The network device sends first type system information used by a terminal device to perform cell detection in a non-standalone cell which cannot be camped. The method includes: transmitting first type system information for a terminal device to perform cell detection, wherein the first type system information is system information for a non-standalone cell which cannot be camped.

19 Claims, 3 Drawing Sheets

(51) Int. Cl.
*H04W 76/11* (2018.01)
*H04L 5/14* (2006.01)
*H04W 36/04* (2009.01)
*H04W 72/00* (2009.01)
*H04W 84/04* (2009.01)

(52) U.S. Cl.
CPC .......... *H04W 72/005* (2013.01); *H04W 76/11* (2018.02); *H04W 84/042* (2013.01)

(56) References Cited

U.S. PATENT DOCUMENTS

| | | | |
|---|---|---|---|
| 2013/0094424 A1 | 4/2013 | Dhanda et al. | |
| 2014/0086173 A1 | 3/2014 | Sadeghi et al. | |
| 2014/0126508 A1* | 5/2014 | Young | H04W 4/70 370/329 |
| 2014/0169238 A1 | 6/2014 | Cai et al. | |
| 2016/0219625 A1* | 7/2016 | Lee | H04W 74/0833 |
| 2017/0006447 A1 | 1/2017 | Bahta et al. | |
| 2018/0132168 A1* | 5/2018 | Ingale | H04W 48/12 |
| 2018/0324660 A1* | 11/2018 | Jung | H04W 36/0055 |
| 2019/0289531 A1* | 9/2019 | Takahashi | H04W 48/08 |
| 2019/0319686 A1* | 10/2019 | Chen, IV | H04B 7/088 |
| 2020/0367150 A1* | 11/2020 | Chun | H04W 48/18 |

FOREIGN PATENT DOCUMENTS

| | | |
|---|---|---|
| CN | 103957577 | 7/2014 |
| CN | 102246582 | 8/2014 |
| CN | 104412657 | 3/2015 |
| CN | 105323808 | 2/2016 |
| CN | 105873136 | 8/2016 |
| CN | 105992168 | 10/2016 |
| CN | 106211268 | 12/2016 |
| CN | 106954235 | 7/2017 |
| CN | 106954238 | 7/2017 |
| JP | 2015216471 | 12/2015 |
| JP | 2015536097 | 12/2015 |
| JP | 2018521525 | 8/2018 |
| KR | 20100080919 | 7/2010 |
| TW | 201503732 | 1/2015 |
| WO | 2015111484 | 7/2015 |
| WO | 2016130354 | 8/2016 |
| WO | 2016195617 | 12/2016 |
| WO | 2017063661 | 4/2017 |
| WO | 2017122751 | 7/2017 |

OTHER PUBLICATIONS

Ericsson, "ANR for NSA NR," 3GPP TSG-RAN WG2 #98, Tdoc R2-1704108, May 2017, 5 pages.
Huawei et al., "Automatic Neighbour Relation in NR," 3GPP TSG-RAN WG2 #98, R2-1704865, May 2017, 3 pages.
Huawei et al., "Cell selection for NR non-standalone and NR standalone UE operation," 3GPP TSG-RAN WG2 Meeting #96, R2-168569, Nov. 2016, 4 pages.
Nokia et al., "Cell global identity and ANR functionality," 3GPP TSG-RAN WG2 Meeting #98, R2-1704331, May 2017, 4 pages.
Samsung, "Initial overview on new carrier," 3GPP TSG RAN WG2#78, R2-122887, May 2012, 2 pages.
EPO, Office Action for EP Application No. 17919613.4, dated May 27, 2020.
JPO, Office Action for JP Application No. 2019-564540, dated May 7, 2021.
KIPO, Office Action for KR Application No. 10-2019-7034332, dated May 14, 2021.
CNIPA, First Office Action for CN Application No. 202010295535.1, dated Jun. 3, 2021.
Huawei, HiSilicon, "SIB for Rel-13 Low Complexity MTC", 3GPP TSG-RAN WG2 #89bis, R2-151389, Apr. 2015.
Chen et al., "Analyse and Optimize on Algorithm of SIB Decoder in WCDMA System", Electronic Test, Jan. 2011.
IPO, Office Action for IN Application No. 201917050621, dated May 25, 2021.
CNIPA, Notification to Grant Patent Right for Invention for CN Application No. 202010295535.1, dated Sep. 23, 2021.
KIPO, Office Action for KR Application No. 10-2019-7034332, dated Nov. 9, 2021.
TIPO, First Office Action for TW Application No. 107126247, dated Sep. 14, 2021.

* cited by examiner

US 11,304,105 B2

SYSTEM INFORMATION SENDING METHOD, NETWORK DEVICE AND TERMINAL DEVICE

CROSS-REFERENCE TO RELATED APPLICATION

This application is a U.S. national phase application of International Application No. PCT/CN2017/094884, filed Jul. 28, 2017, the entire disclosure of which is incorporated herein by reference.

TECHNICAL FIELD

The present disclosure relates to the field of communications, and more particularly to a method for transmitting system information, a network device and a terminal device.

BACKGROUND

In a 5G communication system, cells in a network may be classified into a standalone cell which can be camped and a non-standalone cell which cannot be camped (e.g., a Barred Cell, a non-independent working cell, etc.). At this stage, a network device sends the same system information for both kinds of cells.

SUMMARY

Implementations of the present disclosure provide a method for transmitting system information, a network device, and a terminal device.

In a first aspect, the implementation of the present disclosure provides a method for transmitting system information, including:

sending first type system information used by a terminal device to perform cell detection, wherein the first type system information is system information for a non-standalone cell which cannot be camped.

In an implementation of the first aspect, the method further includes:

sending second type system information for the terminal device to perform cell access, wherein the second type system information is system information for a standalone cell which can be camped.

In an implementation of the first aspect, before sending at least one of the first type system information and the second type system information, the method further includes:

sending indication information to the terminal device, wherein the indication information is used for indicating whether the system information to be sent is at least one of first type system information or second type system information, or the indication information is used for indicating whether the cell corresponding to the system information to be sent is at least one of a non-standalone cell or a standalone cell.

In an implementation of the first aspect, sending the indication information to the terminal device includes:

sending the indication information to the terminal device through a physical broadcast channel PBCH.

In an implementation of the first aspect, the first type system information includes at least one type of public land mobile communication network PLMN information, tracking area TA information, radio access network area RAN AREA information, a cell identification ID, whether the cell is barred, and whether intrafrequency cell reselection is allowed.

In an implementation of the first aspect, the second type system information includes at least one type of PLMN information, TA information, RAN AREA information, a cell ID, whether the cell is barred, whether intrafrequency cell reselection is allowed, time division duplex TDD configuration, cell selection information, and scheduling information of other system information.

In a second aspect, the implementation of the present disclosure provides a method for transmitting system information, including:

receiving indication information sent by a network device, wherein the indication information is used for indicating whether each system information to be received in the at least one system information to be received is first type system information or second type system information, or the indication information is used for indicating whether each cell in the at least one cell is a standalone cell or a non-standalone cell;

wherein the first type system information includes information for performing cell detection by a terminal device, and the second type system information includes information for performing cell access by a terminal device; system information for the non-standalone cell is first type system information, and system information for the standalone cell is second type system information.

In an implementation of the second aspect, the method further includes:

receiving at least one system information to be received sent by the network device, wherein each system information to be received corresponds to one cell; and determining, according to the indication information, whether the system information to be received corresponding to each cell is first type system information or second type system information.

In an implementation of the second aspect, the first type system information includes at least one type of public land mobile communication network PLMN information, tracking area TA information, radio access network area RAN AREA information, a cell identification ID, whether the cell is barred, and whether intrafrequency cell reselection is allowed.

In an implementation of the second aspect, the second type system information includes at least one type of PLMN information, TA information, RAN AREA information, a cell ID, whether the cell is barred, whether intrafrequency cell reselection is allowed, time division duplex TDD configuration, cell selection information, and scheduling information of other system information.

In an implementation of the second aspect, receiving the indication information sent by the network device includes:

receiving the indication information sent by the network device through a physical broadcast channel PBCH.

In a third aspect, the implementation of the present disclosure provides a network device, including can modules or units which can perform the method in the first aspect or any optional implementation of the first aspect.

In a fourth aspect, the implementation of the present disclosure provides a terminal device, including can modules or units which can perform the method in the second aspect or any optional implementation of the second aspect.

In a fifth aspect, a network device is provided. The network device includes a processor, a memory, and a communication interface. The processor is coupled to the memory and communication interface. The memory is for storing instructions for the processor to execute, and the communication interface is for communicating with other network elements under the control of the processor. When the processor executes the instructions stored in the memory, the execution causes the processor to perform the method of the first aspect or any of the possible implementations of the first aspect.

In a sixth aspect, a terminal device is provided. The terminal device includes a processor, a memory, and a communication interface. The processor is coupled to the memory and communication interface. The memory is for storing instructions for the processor to execute, and the communication interface is for communicating with other network elements under the control of the processor. When the processor executes the instructions stored in the memory, the execution causes the processor to perform the method of the second aspect or any of the possible implementations of the second aspect.

In a seventh aspect, a computer storage medium is provided, the program storage medium storing program codes for instructing a computer to perform instructions of the method of the first aspect or any of the possible implementations of the first aspect.

In an eighth aspect, a computer storage medium is provided, the program storage medium storing program codes for instructing a computer to perform instructions of the method of the second aspect or any of the possible implementations of the second aspect.

In a ninth aspect, a computer program product is provided, including instructions that, when executed on a computer, cause a computer to perform the methods described in the various aspects above.

DETAILED DESCRIPTION

Figure 1:
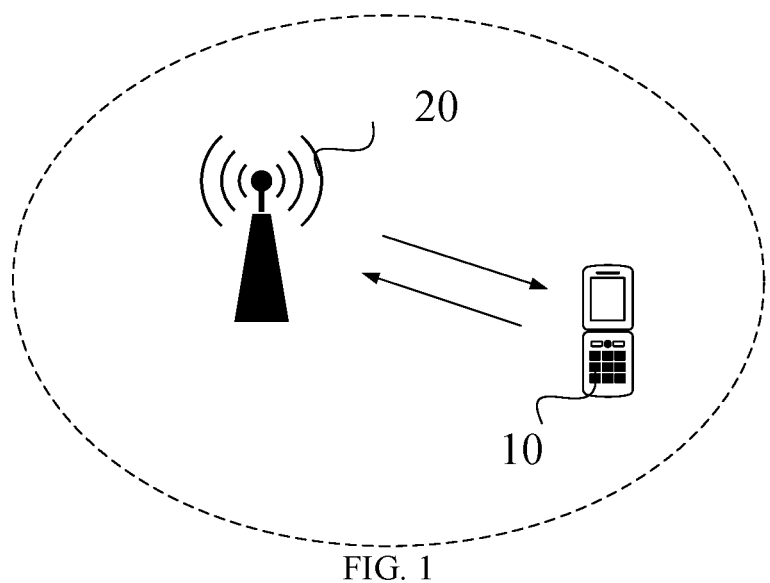
FIG. 1 is a schematic diagram of an application scenario of an implementation of the present disclosure.

The technical solutions in the implementations of the present disclosure will be clearly and completely described in the following with reference to the accompanying drawings in the implementations.

It should be understood that the technical solutions of the implementations of the present disclosure can be applied to various communication systems, for example, a Global System of Mobile communication (GSM) system, a Code Division Multiple Access (CDMA) system, a Wideband Code Division Multiple Access (WCDMA) system, General Packet Radio Service (GPRS), a LTE system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, New Radio (NR) or a future 5G system, etc.

In particular, the technical solutions of the implementations of the present disclosure can be applied to various communication systems based on non-orthogonal multiple access technologies, such as a sparse code multiple access (SCMA) system, and a low density signature (LDS) system, etc. Of course, the SCMA system and the LDS system may also be referred to as other names in the communication field. Further, the technical solutions of the implementations of the present disclosure can be applied to a multi-carrier transmission system using non-orthogonal multiple access technology, for example, Orthogonal Frequency Division Multiplexing (OFDM), Filter Bank Multi-Carrier (FBMC), Generalized Frequency Division Multiplexing (GFDM), a Filtered Orthogonal Frequency Division Multiplexing (Filtered-OFDM, F-OFDM) system using non-orthogonal multiple access technology, and the like.

The terminal device in the implementations of the present disclosure can also refer to a user equipment (UE), an access terminal, a subscriber unit, a subscriber station, a mobile station, a mobile platform, a remote station, a remote terminal, a mobile device, a user terminal, a terminal, a wireless communication device, and a user agent or a user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in a future 5G network, a terminal device in a future evolved public land mobile network (PLMN) or the like, which is not limited in the implementations of the present disclosure.

The network device in the implementations of the present disclosure can be a device for communicating with a terminal device. For example, the network device can be a base station (Base Transceiver Station, BTS) in a GSM or CDMA system, or can be a base station (NodeB, NB) in a WCDMA system, or can be an evolved base station (Evolutional Node, eNB or eNodeB) in an LTE system, or may be a wireless controller in a cloud radio access network (CRAN) scenario, or the network device can be a relay station, an access point, an in-vehicle device, a wearable device, and a network device in a future 5G network, a network device in a future evolved PLMN network or the like, which is not limited in the implementations of the present disclosure.

FIG. 1 is a schematic diagram of an application scenario of an implementation of the present disclosure. The communication system in FIG. 1 may include a terminal device 10 and a network device 20. The network device 20 is configured to provide communication services for the terminal device 10 and provide access to the core network for the terminal device 10. The terminal device 10 accesses the network by searching for synchronization signals, broadcast signals, and the like transmitted by the network device 20, thereby performing communication with the network. The arrows shown in FIG. 1 may represent uplink/downlink transmissions by a cellular link between the terminal device 10 and the network device 20.

In at least one implementation, the network device 20 may cover a plurality of cells at the same time, and the plurality of cells may include standalone cells for the terminal device 10, and may include non-standalone cells for the terminal device 10.

In the implementation of the present disclosure, the network device 20 may send first type system information to the terminal device 10 in a non-standalone cell which cannot be camped.

In at least one implementation, the first type system information includes at least one type of public land mobile network (PLMN) information, tracking area (TA) information, and radio access network area (Radio Access Network AREA, RAN AREA) information, a cell identity (Identity, ID), whether the cell is barred, and whether intrafrequency cell reselection is allowed.

For example, the information included in the first type system information may be any one of the following information or combined information:

{PLMN information}, {TA information}, {RAN AREA information}, {cell ID}, {whether the cell is barred}, {whether intrafrequency cell reselection is allowed}, {PLMN information, TA information}, {PLMN information, RAN AREA information}, {PLMN information, cell ID}, {PLMN information, whether the cell is barred}, {PLMN information, whether intrafrequency cell reselection is allowed}, {TA information, RAN AREA information}, {TA information, cell ID}, {TA information, whether the cell is barred}, {TA information, whether intrafrequency cell reselection is allowed}, {RAN AREA information, cell ID}, {RAN AREA information, whether the cell is barred}, {RAN AREA information, whether intrafrequency cell reselection is allowed}, {Cell ID, whether the cell is barred}, {Cell ID, whether intrafrequency cell reselection is allowed}, {whether the cell is barred, whether intrafrequency cell reselection is allowed}, {PLMN information, TA information, RAN AREA information}, {PLMN information, TA information, cell ID}, {PLMN information, TA information, whether the cell is barred}, {PLMN information, TAinformation, whether intrafrequency cell reselection is allowed}, {PLMN information, RAN AREA information, cell ID}, {PLMN information, RAN AREA information, whether the cell is barred}, {PLMN information, RAN AREA information, whether intrafrequency cell reselection is allowed}, {PLMN information, cell ID, whether the cell is barred}, {PLMN information, cell ID, whether intrafrequency cell reselection is allowed}, {PLMN information, whether the cell is barred, whether intrafrequency cell reselection is allowed}, {TA information, RAN AREA information, cell ID}, {TA information, RAN AREA information, whether the cell is barred}, {TA information, RAN AREA information, whether intrafrequency cell reselection is allowed}, {TA information, cell ID, whether the cell is barred}, {TA information, cell ID, whether intrafrequency cell reselection is allowed}, {TA information, whether the cell is barred, whether intrafrequency cell reselection is allowed}, {RAN AREA information, cell ID, whether the cell is barred}, {RAN AREA information, cell ID, whether intrafrequency cell reselection is allowed}, {RAN AREA information, whether the cell is barred, whether intrafrequency cell reselection is allowed}, {PLMN information, TA information, RAN AREA information, cell ID}, {PLMN information, TA information, RAN AREA information, whether the cell is barred}, {PLMN information, TA information, RAN AREA information, whether intrafrequency cell reselection is allowed}, {PLMN information, RAN AREA information, cell ID, whether the cell is barred}, {PLMN information, RAN AREA information, cell ID, whether intrafrequency cell reselection is allowed}, {PLMN information, cell ID, whether the cell is barred, whether intrafrequency cell reselection is allowed}, {TA information, RAN AREA information, cell ID, whether the cell is barred}, {TA information, RAN AREA information, cell ID, whether intrafrequency cell reselection is allowed}, {RAN AREA information, cell ID, whether the cell is barred, whether intrafrequency cell reselection is allowed}, {PLMN information, TA information, RAN AREA information, cell ID, whether the cell is barred}, {PLMN information, TA information, RAN AREA information, cell ID, whether intrafrequency cell reselection is allowed}, {PLMN information, TA information, RAN AREA information, cell ID, whether the cell is barred, whether intrafrequency cell reselection is allowed}.

In the implementation of the present disclosure, the network device 20 may send second type system information to the terminal device 10 in the standalone cell which can be camped.

In at least one implementation, the second type system information includes at least one type of public land mobile network (PLMN) information, tracking area (TA) information, and radio access network area (Radio Access Network AREA, RAN AREA) information, cell identifier (Identity, ID), whether the cell is barred, whether intrafrequency cell reselection is allowed, time division duplex (TDD) configuration, cell selection information and scheduling information of other system information.

In at least one implementation, the second type system information may further include a configuration or threshold of cell selection.

It should be understood that the information included in the second type system information may be information or combination of information generated in the same manner as the first type system information. For brevity, no further details are provided herein.

The method for transmitting system information provided by the implementation of the present disclosure may be applied to a terminal device including a hardware layer, an operating system layer running on the hardware layer, and an application layer running on the operating system layer. The hardware layer includes hardware such as a central processing unit (CPU), a memory management unit (MMU), and a memory (also referred to as main memory). The operating system may be any one or more computer operating systems that implement business processing through a process, such as a Linux operating system, a Unix operating system, an Android operating system, an iOS operating system, a Windows operating system or the like. The application layer includes applications such as a browser, a contact list, word processing software, and instant messaging software.

The method for transmitting system information provided by the implementation of the present disclosure may be applied to a network device which may be an access network device or a data network, that is, a core network.

Furthermore, various aspects or features of the present disclosure can be implemented as a method, an apparatus, or an article of manufacture using standard programming and/or engineering techniques. The term "article of manufacture" as used in this disclosure encompasses a computer program accessible from any computer-readable device, carrier, or media. For example, the computer readable medium may include, but is not limited to, a magnetic storage device (e.g., a hard disk, a floppy disk, or a magnetic tape, etc.), such as a compact disc (CD), a digital versatile disc (Digital Versatile Disc, DVD), etc., a smart card and a flash memory device (e.g., an Erasable Programmable Read-Only Memory (EPROM) card, stick or key driver, etc.). In addition, various storage media described herein can represent one or more devices and/or other machine readable media for storing information. The term "machine readable medium" may include, but is not limited to, a variety of media capable of storing, containing, and/or carrying instructions and/or data.

It should be understood that the terms "system" and "network" are used interchangeably herein. The term "and/or" in this context is merely an association describing the associated object, indicating that there may be three relationships, for example, A and/or B, which may indicate three situations that only A exists, only B exists, and both A and B exist, respectively. In addition, the character "/" herein generally indicates that the contextual object is an "or" relationship.

Figure 2:
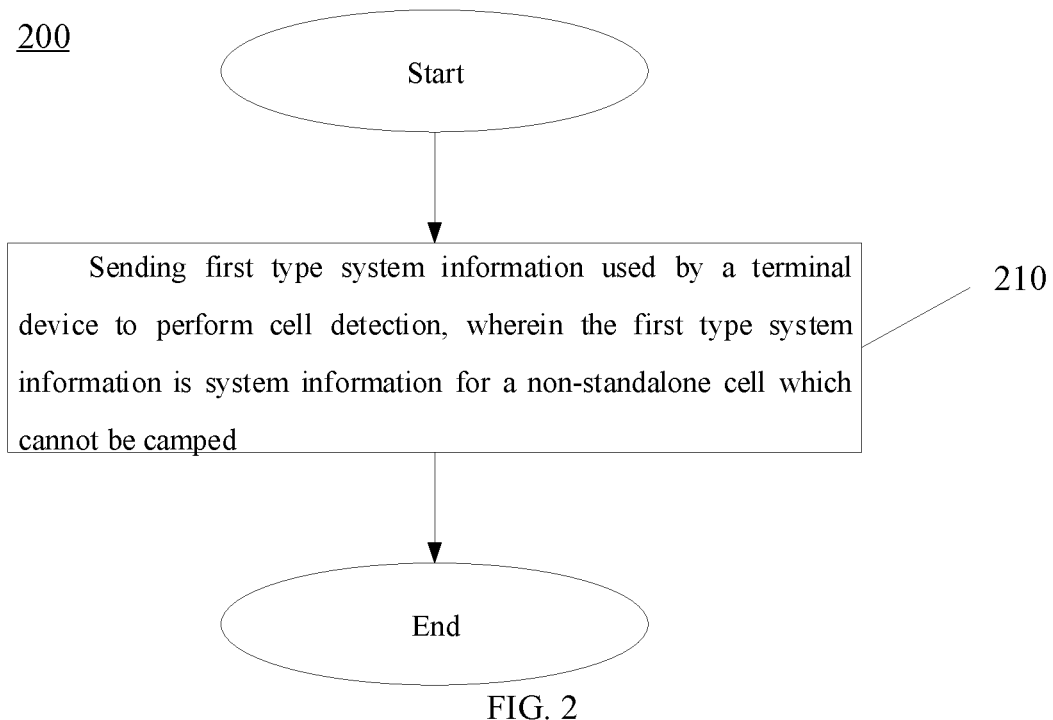
FIG. 2 is a schematic flowchart of a method for transmitting system information according to an implementation of the present disclosure.

FIG. 2 is a schematic flowchart of a method 200 for transmitting system information according to an implementation of the present disclosure. As shown in FIG. 2, the method 200 may be performed by a network device, which may be a network device as shown in FIG. 1. The terminal device in the method 200 may be a terminal device as shown in FIG. 1. The method 200 includes the following.

At 210, first type system information used by the terminal device to perform cell detection is sent, wherein the first type system information is system information for a non-standalone cell which cannot be camped.

It should be understood that each cell corresponds to one system information.

It should also be understood that the terminal device can perform cell detection in the non-standalone cell, for example, to obtain an Auto Neighbor Relationship (ANR).

In at least one implementation, the network device can distinguish a standalone cell which can be camped from a non-standalone cell which cannot be camped.

It should be understood that the network device sends the first type system information to the terminal device.

In at least one implementation, the network device sends the first type system information to the terminal device through the terminal device non-standalone cell.

In at least one implementation, the network device may send the first type system information to the terminal device through a Physical Downlink Shared Channel (PDSCH).

In at least one implementation, the first type system information includes at least one type of PLMN information, TA information, RAN AREA information, a cell ID, whether the cell is barred, and whether intrafrequency cell reselection is allowed.

In at least one implementation, the cell ID may be a Global Cellular Identity (GCI).

In at least one implementation, the method 200 further includes:

sending second type system information for the terminal device to perform cell access, wherein the second type system information is system information for a standalone cell which can be camped.

It should be understood that the terminal device may access to a cell in a standalone cell. For example, the terminal device may directly switch to the standalone cell.

It should also be understood that the network device sends the second type system information to the terminal device.

In at least one implementation, the network device may send the second type system information to the terminal device through a PDSCH.

In at least one implementation, the second type system information includes at least one type of PLMN information, TA information, RAN AREA information, a cell ID, whether the cell is barred, whether intrafrequency cell reselection is allowed, TDD configuration, cell selection information, and scheduling information of other system information.

In at least one implementation, the second type system information may further include a configuration or threshold of cell selection.

In at least one implementation, before the network device sends the first type system information and/or the second type system information to the terminal device, the method 200 further includes:

sending indication information to the terminal device, wherein the indication information is used for indicating whether the system information to be sent is first type system information and/or second type system information.

In at least one implementation, before the network device sends the first type system information and/or the second type system information to the terminal device, the method 200 further includes:

sending indication information to the terminal device, wherein the indication information is used for indicating whether the cell corresponding to the system information to be sent is a non-standalone cell and/or a standalone cell.

It should be understood that the system information sent by the network device may include only the first type system information, or may include only the second type system information, and may also include both of the first type system information and the second type system information.

It should also be understood that the cell corresponding to the system information sent by the network device may include only the non-standalone cell, or may include only the standalone cell, and may also include both of the non-standalone cell and the standalone cell.

In at least one implementation, after receiving the indication information, the terminal device may determine, from the indication information, whether the system information that is subsequently sent by the network device in each cell is first type system information or second type system information, and further, may be actively obtain suitable system information of a cell.

In at least one implementation, the indication information may be integrated in the main system information sent through a physical broadcast channel.

In at least one implementation, the indication information is sent to the terminal device through a Physical Broadcast Channel (PBCH).

Accordingly, in the method for transmitting system information in the implementation of the present disclosure, the network device sends the first type system information for implementing the cell detection by the terminal device in the non-standalone cell of the terminal device, and thus, in the first type system information, it only contains the necessary information for cell detection, and can avoids unnecessary signaling overhead during the transmission of system information.

Further, the network device can send the second type system information for implementing the cell access by the terminal device in the standalone cell, so that different system information can be configured for the standalone cell which can be camped and the non-standalone cell which cannot be camped, which can optimize system information.

Further, the network device sends the indication information to the terminal device to indicate whether the system information sent by the cell is first type system information or second type system information, so that the terminal device can determine the type of the system information of each cell in advance according to the indication information, and thus, can receive system information in a targeted manner, which can reduce the signaling overhead generated during the reception of system information.

Figure 3:
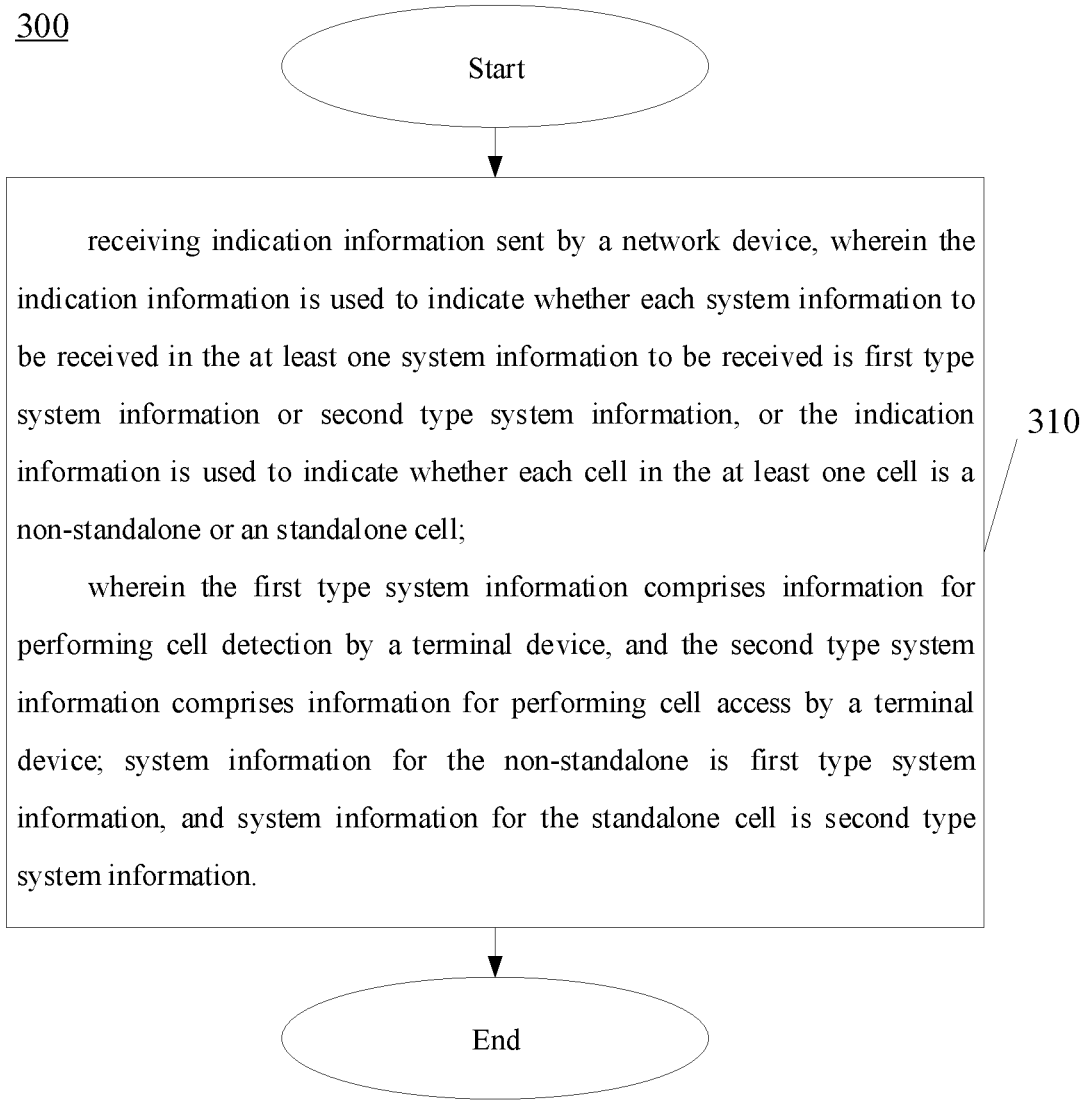
FIG. 3 is a schematic flowchart of another method for transmitting system information according to an implementation of the present disclosure.

FIG. 3 is a schematic flowchart of another method 300 for transmitting system information according to an implementation of the present disclosure. As shown in FIG. 3, the method 300 may be performed by a terminal device, which may be a terminal device as shown in FIG. 1. The network device in the method 300 may be a network device as shown in FIG. 1. The method 300 includes the following.

At 310, indication information sent by the network device is received, wherein the indication information is used for indicating whether each system information to be received in the at least one system information to be received is first type system information or second type system information, or the indication information is used for indicating whether each cell in the at least one cell is a standalone cell or a non-standalone cell.

The first type system information includes information for performing cell detection by the terminal device, and the second type system information includes information for performing cell access by the terminal device. System information for the non-standalone cell is first type system information, and system information for the standalone cell is second type system information.

In at least one implementation, the first type system information includes at least one type of PLMN information, TA information, RAN AREA information, a cell ID, whether the cell is barred, and whether intrafrequency cell reselection is allowed.

In at least one implementation, the second type system information includes at least one type of PLMN information, TA information, RAN AREA information, a cell ID, whether the cell is barred, whether intrafrequency cell reselection is allowed, TDD configuration, cell selection information, and scheduling information of other system information.

The method 300 also includes:
receiving at least one system information to be received sent by the network device, wherein each system information to be received corresponds to one cell; and
determining, according to the indication information, whether the system information to be received corresponding to each cell is first type system information or second type system information.

In at least one implementation, the terminal device receives the indication information sent by the network device through the PBCH.

It should be understood that the steps in the method 300 for transmitting system information may refer to the description of the corresponding steps in the method 200 for transmitting system information, and for brevity, no further details are provided herein.

Therefore, in the method for transmitting system information in the implementation of the present disclosure, the terminal device receives indication information sent by the network device, which indicates whether the system information sent by the cell is first type system information or second type system information, so that the terminal device can determine the type of the system information of each cell in advance according to the indication information and thus can receive system information in a targeted manner, which can reduce the signaling overhead generated during the reception of system information.

Figure 4:
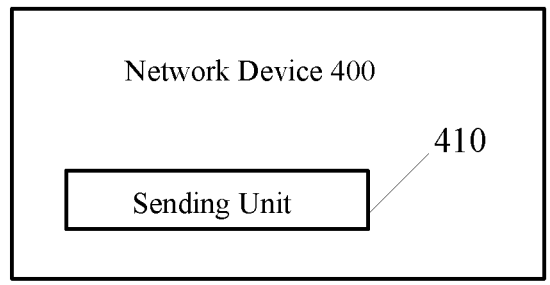
FIG. 4 is a schematic block diagram of a network device according to an implementation of the present disclosure.

FIG. 4 is a schematic block diagram of a network device 400 according to an implementation of the present disclosure. As shown in FIG. 4, the network device 400 includes:
a sending unit 410 configured to send first type system information used by the terminal device to perform cell detection, wherein the first type system information is system information for a non-standalone cell which cannot be camped.

In at least one implementation, the sending unit 410 is further configured to send second type system information used by the terminal device to perform cell access, wherein the second type system information is system information for a standalone cell which can be camped.

In at least one implementation, before the sending unit 410 sends the first type system information and/or the second type system information, the sending unit 410 is further configured to send, to the terminal device, indication information, wherein the indication information is used for indicating whether the system information to be sent is first type system information and/or second type system information, or the indication information is used for indicating that the cell corresponding to the system information to be sent is a non-standalone cell and/or a standalone cell.

In at least one implementation, the sending unit 410 is further configured to send the indication information to the terminal device through a physical broadcast channel PBCH.

In at least one implementation, the first type system information includes at least one type of public land mobile communication network PLMN information, tracking area TA information, radio access network area RAN AREA information, a cell identification ID, whether the cell is barred, and whether intrafrequency cell reselection is allowed.

In at least one implementation, the second type system information includes at least one type of PLMN information, TA information, RAN AREA information, a cell ID, whether the cell is barred, whether intrafrequency cell reselection is allowed, time division duplex TDD configuration, cell selection information, and scheduling of other system information.

It should be understood that the above and other operations and/or functions of the various modules in the network device 400 according to the implementation of the present disclosure are respectively implemented in order to perform the corresponding steps of the network device in the method 200 in FIG. 2, which will not be repeated for the sake of brevity.

Figure 5:
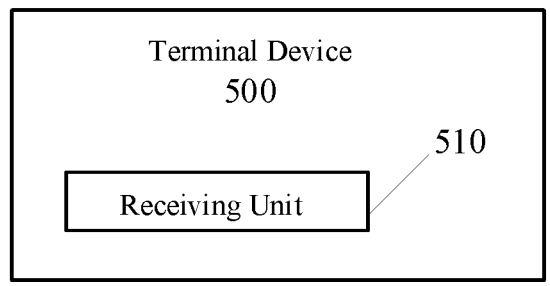
FIG. 5 is a schematic block diagram of a terminal device according to an implementation of the present disclosure.

FIG. 5 is a schematic block diagram of a terminal device 500 according to an implementation of the present disclosure. As shown in FIG. 5, the terminal device 500 includes:
a receiving unit 510 configured to receive indication information sent by the network device, wherein the indication information is used for indicating whether each system information to be received in the at least one system information to be received is first type system information or second type system information, or the indication information is used for indicating whether each cell in the at least one cell is a standalone cell or a non-standalone cell;
wherein the first type system information includes information for performing cell detection by the terminal device, and the second type system information includes information for performing cell access by the terminal device; system information for a standalone cell is first type system information, and system information for a non-standalone cell is second type system information.

In at least one implementation, the terminal device 500 further includes:

the receiving unit 510 further configured to receive the at least one system information to be received sent by the network device, wherein each system information to be received corresponds to one cell; and a determining unit 520 configured to determine, according to the indication information, whether the system information to be received corresponding to each cell is first type system information or second type system information.

In at least one implementation, the first type system information includes at least one of public land mobile communication network PLMN information, tracking area TA information, radio access network area RAN AREA information, a cell identification ID, whether the cell is barred, and whether intrafrequency cell reselection is allowed.

In at least one implementation, the second type system information includes at least one of PLMN information, TA information, RAN AREA information, a cell ID, whether the cell is barred, whether intrafrequency cell reselection is allowed, time division duplex TDD configuration, cell selection information, and scheduling of other system information.

In at least one implementation, the receiving unit 510 is further configured to receive the indication information sent by the network device through a physical broadcast channel PBCH.

It should be understood that the above and other operations and/or functions of the respective modules in the terminal device 500 according to the implementations of the present disclosure are respectively implemented in order to perform the corresponding steps of the terminal device in the method 300 in FIG. 3, which will not be repeated for the sake of brevity.

Figure 6:
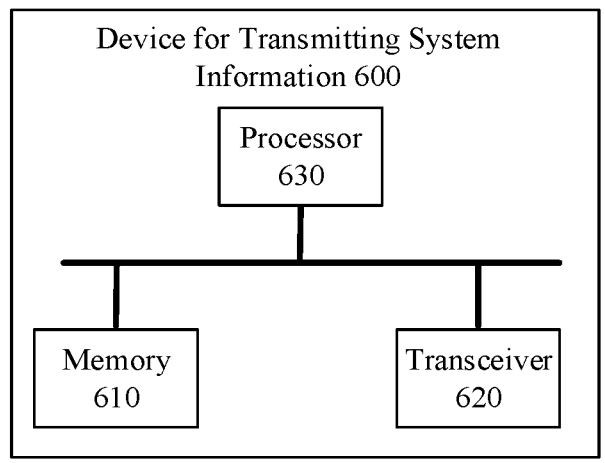
FIG. 6 is a schematic block diagram of a device for transmitting system information provided by an implementation of the present disclosure.

FIG. 6 is a schematic block diagram of a device 600 for transmitting system information provided by an implementation of the present disclosure. The device 600 includes:

a memory 610 configured to store a program, wherein the program includes codes;

a transceiver 620 configured to communicate with other devices; and a processor 630 configured to execute the program codes in the memory 610.

In at least one implementation, when the codes are executed, the processor 630 can implement various operations performed by the network device in the method 200 in FIG. 2, which will not be described herein for brevity. At this time, the device 600 may be an access network device or a core network device. The transceiver 620 is configured to perform specific signal transmission and reception under the driving of the processor 630.

In at least one implementation, when the codes are executed, the processor 630 can also implement various operations performed by the terminal device in the method 300 in FIG. 3, which will not be described herein for brevity. In this case, the device 600 can be a terminal device, such as a mobile phone.

It should be understood that, in the implementation of the present disclosure, the processor 630 may be a central processing unit (CPU), and the processor 630 may also be other general-purpose processor, a digital signal processor (DSP), and an application specific integrated circuit (ASIC), a field programmable gate array (FPGA) or other programmable logic device, a discrete gate or transistor logic device, a discrete hardware component, and the like. The general purpose processor may be a microprocessor or the processor may be any conventional processor or the like.

The memory 610 can include a read only memory and a random access memory and provides instructions and data to the processor 630. A portion of the memory 610 may also include a non-volatile random access memory. For example, the memory 610 can also store information of the device type.

The transceiver 620 can be configured to implement signal transmission and reception functions, such as frequency modulation and demodulation functions or up conversion and down conversion functions.

In an implementation process, at least one step of the above method may be completed by an integrated logic circuit of hardware in the processor 630, or the integrated logic circuit may be driven by an instruction in a software form to complete the at least one step. Thus, the device 600 for transmitting system information can be a chip or a chip set. The steps of the method disclosed in the implementations of the present disclosure may be directly implemented as a hardware processor, or may be performed by a combination of hardware and software modules in the processor. The software module can be located in a conventional storage medium such as a random access memory, a flash memory, a read only memory, a programmable read only memory or an electrically erasable programmable memory, a register, and the like. The storage medium is located in the memory, and the processor 630 reads the information in the memory and completes the steps of the above method in combination with the hardware thereof. To avoid repetition, it will not be described in detail here.

Figure 7:
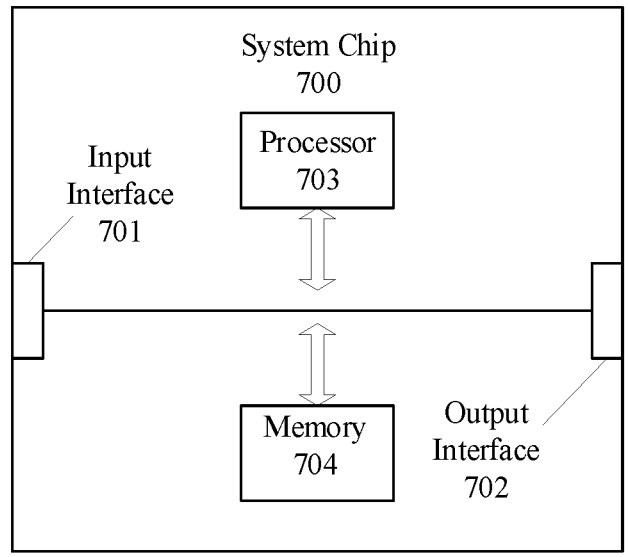
FIG. 7 is a schematic block diagram of a system chip according to an implementation of the present disclosure.

FIG. 7 is a schematic structural diagram of a system chip 700 according to an implementation of the present disclosure. The system chip 700 of FIG. 7 includes an input interface 701, an output interface 702, a processor 703, and a memory 704 that can be connected by an internal communication connection line. The processor 703 is configured to execute codes in the memory 704.

In at least one implementation, when the codes are executed, the processor 703 implements the method performed by the network device in the method implementation, which will not be described for the sake of brevity.

In at least one implementation, when the codes are executed, the processor 703 implements the method performed by the terminal device in the method implementation, which will not be described for the sake of brevity.

In the above implementations, it may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions described according to implementations of the present disclosure are generated in whole or in part. The computer can be a general purpose computer, a special purpose computer, a computer network, or other programmable device. The computer instructions can be stored in a computer readable storage medium or transferred from one computer readable storage medium to another computer readable storage medium, for example, the computer instructions can be transmitted from a website site, a computer, a server or a data center to another website site, computer, server or data center in a wired manner (for example, through coaxial cables optic fibers, digital subscriber lines (DSL)) or in a wireless manner (e.g. through infrared, wireless, microwave, etc.). The computer readable storage medium can be any available media that can be accessed by a computer or a data storage device such as a server, a data center, or the like that includes one or more available media. The usable medium can be a magnetic medium (e.g., a floppy disk, a hard disk, a magnetic tape), an optical medium (e.g., a DVD), or a semiconductor medium (such as a Solid State Disk (SSD)).

It should be understood that, in the various implementations of the present disclosure, the size of the sequence numbers of the above processes does not mean the order of execution sequence, and the order of execution of each process should be determined by its function and internal logic, and should not be constitute any limitation on the implementation process of the implementation of the present disclosure.

A person skilled in the art can clearly understand that for the convenience and brevity of the description, the specific working process of the system, the device and the unit described above can refer to the corresponding process in the above method implementation, details of which will not be repeated herein.

The above is only a specific implementation of the present disclosure, but the scope of protection of the present disclosure is not limited thereto, and changes or substitutions that could be easily contemplated by any person skilled in the art within the technical scope disclosed in the present disclosure should be covered by the scope of protection of this disclosure. Therefore, the scope of protection of the present disclosure should be determined by the scope of the claims.

What is claimed is:

1. A method for transmitting system information, comprising:
    sending, information to a terminal device, wherein the information is used to indicate whether a cell corresponding to system information to be sent is the cell which the terminal device cannot camp on or the cell which the terminal device has capability to camp on;
    sending, first type system information used by the terminal device to perform cell detection, wherein the first type system information is the system information for the cell which the terminal device cannot camp on; and
    sending, second type system information for the terminal device to perform cell access, wherein the second type system information is the system information for the cell which the terminal device has capability to camp on.

2. The method according to claim 1, wherein sending the information to the terminal device comprises: sending the information to the terminal device (10) through a physical broadcast channel PBCH.

3. The method according to claim 1, wherein the first type system information comprises information for performing cell detection by the terminal device.

4. The method according to claim 1, wherein the first type system information comprises at least one type of public land mobile communication network PLMN information, radio access network area RAN AREA information, a cell identification ID, and whether intrafrequency cell reselection is allowed.

5. The method according to claim 1, wherein the second type system information comprises at least one type of PLMN information, TA information, RAN AREA information, a cell ID, whether intrafrequency cell reselection is allowed, time division duplex TDD configuration, cell selection information, and scheduling information of other system information.

6. A network device, comprising:
    a memory configured to store a program, wherein the program includes codes;
    a transceiver configured to communicate with other devices; and
    a processor configured to execute the program codes in the memory,
    wherein when the codes are executed, the execution causes the network device to perform the method for transmitting system information according to claim 1.

7. The network device according to claim 6, wherein the execution further causes the network device to send the information to the terminal device through a physical broadcast channel PBCH.

8. The network device according to claim 6, wherein the first type system information comprises at least one type of public land mobile communication network PLMN information, radio access network area RAN AREA information, a cell identification ID, and whether intrafrequency cell reselection is allowed.

9. The network device according to claim 6, wherein the second type system information comprises at least one type of PLMN information, TA information, RAN AREA information, a cell ID, whether intrafrequency cell reselection is allowed, time division duplex TDD configuration, cell selection information, and scheduling information of other system information.

10. A method for transmitting system information, comprising:
    receiving, information sent by a network device, wherein the information is used to indicate whether each system information to be received in the at least one system information to be received is first type system information or second type system information, or the information is used to indicate whether each cell in the at least one cell is a cell which a terminal device has capability to camp on or a cell which the terminal device cannot camp on; and
    determining, according to the information, whether the system information to be received is first type system information or second type system information,
    wherein the first type system information comprises information for performing cell detection by a terminal device, and the second type system information comprises information for performing cell access by a terminal device; system information for the cell which the terminal device cannot camp on is first type system information, and system information for the cell which the terminal device has capability to camp on is second type system information.

11. The method according to claim 10, further comprising:
    receiving, at least one system information to be received sent by the network device, wherein each system information to be received corresponds to one cell.

12. The method according to claim 10, wherein the first type system information comprises at least one type of public land mobile communication network PLMN information, radio access network area RAN AREA information, a cell identification ID, and whether intrafrequency cell reselection is allowed.

13. The method according to claim 10, wherein the second type system information comprises at least one type of PLMN information, TA information, RAN AREA information, a cell ID, whether intrafrequency cell reselection is allowed, time division duplex TDD configuration, cell selection information, and scheduling information of other system information.

14. The method according to claim 10, wherein the first type system information comprises information for performing cell detection by the terminal device.

15. A terminal device, comprising:
a memory configured to store a program, wherein the program includes codes;
a transceiver configured to communicate with other devices; and
a processor configured to execute the program codes in the memory,
wherein when the codes are executed, the execution causes the terminal device to:
receive, by the transceiver, information sent by a network device, wherein the information is used to indicate whether each system information to be received in the at least one system information to be received is first type system information or second type system information, or the information is used to indicate whether each cell in the at least one cell is a cell which the terminal device has capability to camp on or a cell which the terminal device cannot camp on; and
determine, according to the information, whether the system information to be received is first type system information or second type system information,
wherein the first type system information comprises information for performing cell detection by the terminal device, and the second type system information comprises information for performing cell access by the terminal device; system information for a cell which the terminal device has capability to camp on is first type system information, and system information for a cell which the terminal device cannot camp on is second type system information.

16. The terminal device according to claim 15, wherein the execution further causes the terminal device to:
receive, by the transceiver, the at least one system information to be received sent by the network device, wherein each system information to be received corresponds to one cell.

17. The terminal device according to claim 15, wherein the first type system information comprises at least one type of public land mobile communication network PLMN information, radio access network area RAN AREA information, a cell identification ID, and whether intrafrequency cell reselection is allowed.

18. The terminal device according to claim 15, wherein the second type system information comprises at least one type of PLMN information, TA information, RAN AREA information, a cell ID, whether intrafrequency cell reselection is allowed, time division duplex TDD configuration, cell selection information, and scheduling information of other system information.

19. The terminal device according to claim 15, wherein the transceiver is further configured to receive the information sent by the network device through a physical broadcast channel PBCH.

* * * * *